Oct. 3, 1967

T. R. SMITH ETAL 3,344,590

UNIT FILTER ASSEMBLY

Filed Sept. 14, 1966

INVENTORS
TOM R. SMITH
ROBERT J. BOYLAN

BY

Ralph B. Brick
ATTORNEY

United States Patent Office 3,344,590
Patented Oct. 3, 1967

3,344,590
UNIT FILTER ASSEMBLY
Tom R. Smith and Robert J. Boylan, Louisville, Ky., assignors to American Air Filter Company, Inc., Louisville, Ky., a corporation of Delaware
Filed Sept. 14, 1966, Ser. No. 579,317
4 Claims. (Cl. 55—484)

The present invention relates to unit filter assemblies and more particularly to an improved unit filter assembly which provides a plurality of filter banks across a gas stream to be treated.

In accordance with the present invention, a unit filter assembly is provided of a type like that set forth in assignee's co-pending applications Ser. No. 476,289, inventor David J. Murphy, Jr., and Ser. No. 490,224, inventor Joseph Keller. The present invention provides a novel modification of such type filter assembly which is simple and straightforward in construction, even further reducing structural parts required and further minimizing tooling and assembly steps required in the erection of the unit filter. In addition, the present invention provides a sturdy, highly efficient filter construction which can be readily manipulated for installation and which can be readily adapted for use with foraminous materials of various types.

Various other features of the present invention will become obvious to one skilled in the art upon reading the disclosure set forth hereinafter.

More particularly, the present invention provides a unit filter assembly comprising: an open-end frame member having an upstream dirty gas inlet and a downstream clean gas outlet; a first self-sustaining, deformable, gas pervious, longitudinally extending, plenum-forming web disposed within the frame member in continuously pleated fashion to provide adjacent pleats of U-shaped cross section, each pleat having its base portion extending transversely across the dirty gas inlet toward the clean gas outlet; a second self-sustaining, deformable, gas pervious, longitudinally extending, plenum-forming web disposed within the frame member in continuously pleated fashion to provide adjacent pleats of U-shaped cross section, each pleat having its base portion extending transversely across the clean gas outlet and having its flank portions extending from the clean gas outlet toward the dirty gas inlet, the flank portions of the pleats of the first and second webs being incrementally folded upon themselves to provide inwardly turned flange members engaging against flank portions of pleats of an opposite web of the plenum forming webs to space adjacent flank portions of the first and second webs and form gas pervious plenum chambers therebetween; and foraminous filter media material disposed within the gas pervious chambers in sufficient quantities to substantially fill the same. In addition, the present invention provides a novel filter medium material making up the deformable, longitudinally extending, plenum-forming webs so as to obtain high gas filtering efficiencies and at the same time to minimize loss of foraminous filter media disposed within the plenum chambers.

It is to be understood that various changes can be made in the arrangement, form and construction of the apparatus disclosed herein without departing from the scope or spirit of the present invention.

Referring to the drawing which discloses one advantageous embodiment of the present invention:

Figure 1:
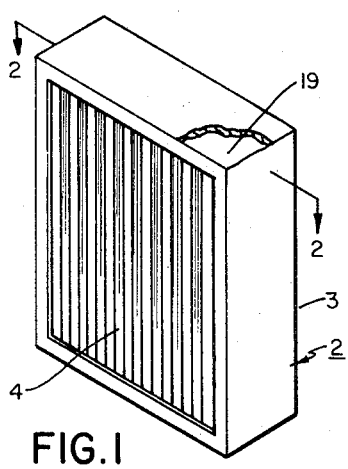
FIGURE 1 is an isometric view of a novel unit filter assembly.

As can be seen in FIGURE 1 of the drawing, the inventive assembly includes open-end rectangular frame member 2 having upstream dirty gas inlet 3 and downstream clean gas outlet 4. Frame member 2 can be formed from any one of a number of suitable materials such as wood or metal, and although advantageously shown in rectangular form, can be of other geometric configurations.

Figure 3:
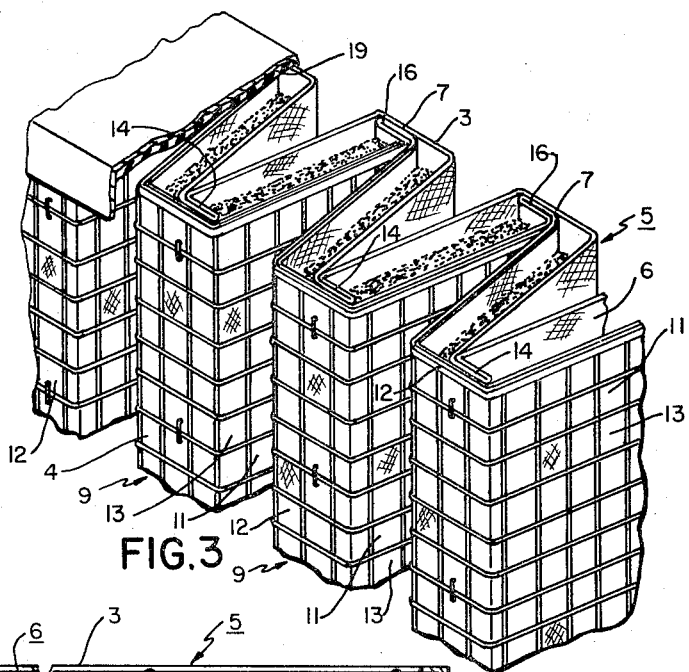
FIGURE 3 is an enlarged isometric view of the plenum-forming web members utilized in construction of the assembly of FIGURES 1 and 2.
Figure 2:
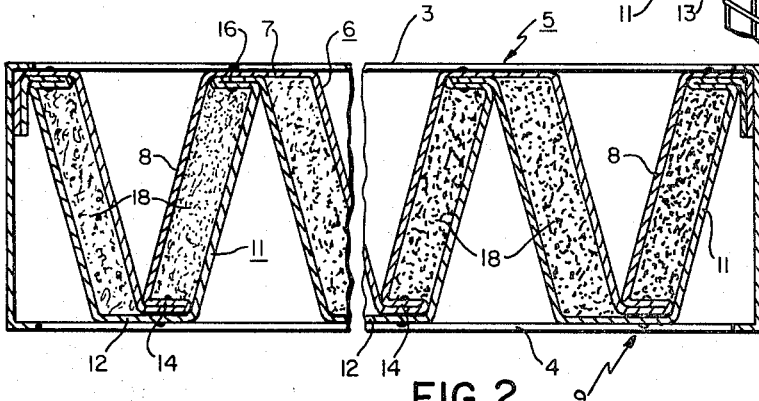
FIGURE 2 is an enlarged cross-sectional view taken in a plane passing through line 2—2 of FIGURE 1, disclosing a portion of the assembly of FIGURE 1.

As can be seen more readily in FIGURES 2 and 3 of the drawing, to form the plenum chambers in frame member 2, a first self-sustaining, deformable, gas pervious, longitudinally extending, plenum-forming web 5 is disposed within the frame member in continuously pleated fashion to provide adjacent pleats 6 of U-shaped cross section. Each pleat 6 has its base portion 7 extending transversely across the dirty gas inlet 3 and has its flank portions 8 extending from the dirty gas inlet toward the clean gas outlet 4. A second self-sustaining, deformable, gas pervious, longitudinally extending, plenum-forming web 9 is disposed in the frame member in a continuously pleated fashion in interposed fashion with web 5 to provide adjacent pleats 11 of U-shaped cross section. Each pleat 11 has its base portion 12 extending transversely across the clean gas outlet 4 and has its flank portions 13 extending from the clean gas outlet 4 toward the dirty gas inlet 3. It is to be noted that the flank portions of pleats 6 and 11 of the first and second webs 5 and 9, respectively, are incrementally folded upon themselves at 14 and 16 of the flank extremities to provide inwardly turned flange members engaging against the flank portions of pleats of an opposite web of the plenum forming webs 5 and 9 so as to space adjacent flank portions 8 and 13 of the first and second webs 5 and 9, respectively, to form gas pervious plenum chambers 18 therebetween. Advantageously, the web 9 on the outlet side can be made of a suitable size metallic hardware cloth sized to prevent the filter media materials disposed within the plenum from passing therethrough. A cloth with a mesh of 5 x 5 strands per inch has been found suitable. If desired, a thin sheet of cotton cloth media with a mesh of 64 x 64 threads per inch can be placed in facing relationship on the upstream side of the downstream web 9 to further serve to retain the filter media particles disposed within the plenum. Furthermore, the upstream web 5 can be formed from a wire screen material of finer size which is flocked with a covering of chopped synthetic fibers secured to the screen material by a suitable adhesive resin. A screen having a mesh of 14 x 14 strands per inch has been found suitable, the screen being covered with chopped $\frac{1}{25}$ inch long rayon threads bonded to the screen by an adhesive resin. Advantageously, each fiber is held by one end, thus giving a porcupine effect.

With the aforedescribed arrangement, it can be seen that a plurality of perforated plenum chambers 18 are formed which extend in pleated form across the open-end frame member 2. It is to be noted that the opposite inner walls of frame member 2 against which the edges of plenum-forming web members 5 and 9 abut can be provided with a sheet of soft, compressible, and pliable sealing gasket material 19 such as sponge rubber to receive and seal such edges.

A suitable foraminous filter media material, such as 6 x 8 mesh activated carbon, can be poured into plenum chambers 18 when they are formed, the media material being supplied in sufficient quantities to substantially fill the same. In this connection, it is to be noted that sealing gaskets 19 can be of sufficient thickness and sufficient compressibility to yieldingly engage against and insure a certain amount of compressibility of the foraminous media material disposed in the plenum chambers to accommodate any settling of such foraminous material.

Thus, in accordance with the present invention, a filter assembly arrangement is provided which is straightforward, economical, and simple in construction requiring fewer structural parts and permitting ready manipulation for installation of foraminous media material.

The invention claimed is:

1. A unit filter assembly comprising: an open-ended frame member having an upstream dirty gas inlet and a downstream clean gas outlet; a first self-sustaining, deformable, gas pervious, longitudinally extending, plenum-forming web disposed within said frame member in continuously pleated fashion to provide adjacent pleats of generally U-shaped cross section, each pleat having a base portion extending a small distance transversely across said dirty gas inlet and having flank portions extending from said dirty gas inlet toward said clean gas outlet; a second, self-sustaining, deformable, gas pervious, longitudinally extending, plenum-forming web disposed within said frame member in continuously pleated fashion to provide adjacent pleats of generally U-shaped cross section, each pleat having a base portion extending a small distance transversely across said clean gas outlet and having flank portions extending from said clean gas outlet toward said dirty gas inlet, said flank portions of said pleats of said first and second webs being incrementally folded upon themselves to provide inwardly turned flange members of smaller extent than said base portions engaging against flank portions of pleats of an opposite web of the plenum-forming webs to space adjacent flank portions of said first and second webs and form gas pervious plenum chambers therebetween; and foraminous material disposed within said gas pervious chambers in sufficient quantities to substantially fill the same.

2. The apparatus of claim 1, said flank portions being folded upon themselves at flank extremities to provide said inwardly turned flange members.

3. The apparatus of claim 1, said first web being of fine screen mesh covered with a flocking of chopped synthetic fibers and said second screen being of hardware cloth covered with a fine mesh cloth.

4. The apparatus of claim 3, said first web having a mesh of 14 x 14 strands per inch and being covered with a chopped rayon fiber flocking, said second web having a mesh of 5 x 5 strands per inch and being covered with a cotton cloth having a mesh of 64 x 64 threads per inch.

References Cited

UNITED STATES PATENTS

| | | | |
|---|---|---|---|
| 2,044,221 | 6/1936 | Myers et al. | |
| 2,053,159 | 9/1936 | Miller | 55—390 X |
| 2,135,863 | 11/1938 | Walker | 55—529 X |
| 3,022,861 | 2/1962 | Harms | 55—521 X |
| 3,124,440 | 3/1964 | Hogg | 55—484 |
| 3,144,315 | 8/1964 | Hunn | 55—521 X |

HARRY B. THORNTON, *Primary Examiner.*

S. SOKOLOFF, *Assistant Examiner.*